Patented June 23, 1936

2,045,476

UNITED STATES PATENT OFFICE 2,045,476

PRINTING PREPARATIONS AND A PROCESS OF PRINTING WITH SAID PREPARATIONS

Karl Krauss, Frankfort-on-the-Main-Fechenheim, and Alfred Hagenböcker, Frankfort-on-the-Main-Hochst, Germany, assignors to General Aniline Works, Inc., New York, N. Y., a corporation of Delaware No Drawing. Application April 4, 1930, Serial No. 441,723. Renewed April 26, 1934. In Germany April 15, 1929

9 Claims. (Cl. 8—6)

The present invention relates to new printing preparations and to a process of printing with the said preparations.

More particularly our invention relates to printing preparations containing a stable reduction product of a thioindigoide dyestuff being substituted by at least one substituent of the group consisting of halogen, alkyl and alkoxy and preferably, an agent capable of exerting a reducing action. These stable reduction products are obtainable, for instance, according to U. S. patent application Serial No. 441,720 and No. 441,721, both filed on April 4, 1930, in the name of Karl Krauss and Alfred Hagenböcker and U. S. Patent No. 1,844,039, by treating a thioindigoide dyestuff being substituted by at least one substituent of the group consisting of halogen, alkyl and alkoxy, with a reducing agent in the presence of an alkali and thereupon, if necessary, treating the reaction mixture with an acid until the alkaline reaction against phenolphthaleine paper has disappeared. In certain cases the stable reduction products are formed by treating the thioindigoide dyestuff with considerably smaller quantities of reducing agent and especially of alkali than are commonly used in preparing a vat of the dyestuff in question, whereby the stable reduction products are obtainable directly without using any acid, i. e. they separate directly from the reaction mixture. In case it is necessary to use larger quantities of the reducing agent and of the alkali the separation of the stable reduction products from the reaction mixture is advantageously completed as described above by adding to the reaction mixture an acid until the alkaline reaction against phenolphthaleine paper has disappeared.

The chemical structure of the said stable reduction products is not known to us. They differ in their properties from the ordinary leuco derivatives of the thioindigoide dyestuffs; whereas the known leuco derivatives of the said dyestuffs are easily soluble in dilute alkalies and are easily reconverted by oxygen or air into the dyestuffs proper, the reduction products obtainable as above described are almost completely insoluble in alkalies and are highly stable to oxygen or air. For these reasons we have defined these compounds as "stable reduction products". Wherever this term appears in the specification and in the appended claims, it is intended to designate the reduction products formed as described above.

It is not necessary that the printing preparations to be used according to our invention should contain the dyestuff exclusively in the form of the said stable reduction compounds. It is quite sufficient if the latter predominate in the paste which may contain in addition a certain percentage of the corresponding dyestuffs.

The addition of a reducing agent, such as, for instance, hydrosulphite, to the printing preparations is not absolutely necessary. However, it is advantageous to add a certain quantity of a reducing agent inasmuch as without such an addition in many cases the dyestuff components contained in the printing paste are only incompletely fixed. However, in most cases it is sufficient to add a considerably smaller quantity of the reducing agent than is necessary when using instead of our stable reduction products the non-reduced vat dyestuffs.

Our new printing compositions may be applied to the material by printing, drying the printed material, steaming for a short time, oxidizing and soaping as usual.

Our printing process gives excellent results in direct printing. As a rule our new printing compositions are fixed much more rapidly than printing colors made with non-reduced dyestuffs. The result is a more efficient rate of working, and, consequently, increased production.

The following examples serve to illustrate the invention, but they are not intended to limit it thereto, the parts being by weight:

(1) A printing paste is prepared by mixing: 150 grams of a paste of 12 per cent. strength of the stable reduction compound of 4.4'-dimethyl-6.6'-dichlorothioindigo (obtainable by heating to 70° C. a mixture of 512 grams of a 13% paste of 4.4'-dimethyl-6.6'-dichlorothioindigo, 400 cc. of alcohol, 2 liters of water and 62 cc. of a caustic soda solution of 33° Bé., adding thereto 40 grams of sodium hydrosulphite concentrated powder and introducing into the mixture after 5 minutes carbonic acid until the alkaline reaction of the mixture against phenolphthaleine paper has disappeared and isolating the product which separates)

80 grams of glycerin
30 grams of the sodium salt of benzylsulfanilic acid
350 grams of wheat starch tragacanth thickening
120 grams of potassium carbonate
75 grams of formaldehyde sulfoxylate
195 grams of water
1000 grams of printing color.

After being printed and dried the material is steamed for a short time (2–3 minutes) in a rapid ager, oxidized and soaped at boiling temperature. The printing thus obtained far surpasses by its intensity of color and beauty of shade the printings obtainable with a paste which contains 4.4'-dimethyl-6.6'-dichlorothioindigo instead of the stable reduction compound of the said dyestuff.

(2) 150 grams of a paste (12 per cent. strength) of the stable reduction compound mentioned in Example 1
80 grams of glycerin
30 grams of the sodium salt of benzylsulfanilic acid
350 grams of wheat starch tragacanth thickening.
120 grams of potassium carbonate
40 grams of formaldehyde sulfoxylate
230 grams of water
1000 grams of printing color.

The printing thus obtained is the same as in Example 1.

(3) 150 grams of a paste (12 per cent. strength) of the stable reduction compound of 6.6'-diethoxythioindigo (obtainable by heating to 70° C.–75° C. a mixture of 1000 grams of 6.6'-diethoxythioindigo, 1000 grams of a caustic soda solution of 40° Bé. and 50 liters of water, adding thereto 700 to 1000 grams of sodium hydrosulfite, stirring the mixture for some time and introducing sulfurous acid until the reaction mass shows an acid reaction against litmus, and isolating the reaction product which separates)
80 grams of glycerin
350 grams of wheat starch tragacanth thickening
120 grams of potassium carbonate
40 grams of formaldehyde sulfoxylate
260 grams of water
1000 grams of printing color.

(4) 150 grams of a paste (12 per cent. strength) of the stable reduction compound of 6.6'-dichloro-thioindigo (obtainable by heating to 70° C. a mixture of 300 grams of a 20% paste of 6.6'-dichloro-thioindigo, 2 liters of water and 62 cc. of a caustic soda solution of 33° Bé., adding thereto 40 grams of sodium hydrosulfite concentrated powder and introducing into the mixture after 5 minutes carbonic acid while cooling the mixture and isolating the product obtained)
80 grams of glycerin
30 grams of the sodium salt of benzylsulfanilic acid
350 grams of wheat starch tragacanth thickening
120 grams of potassium carbonate
40 grams of formaldehyde sulfoxylate
230 grams of water
1000 grams of printing color.

(5) 150 grams of a paste (12 per cent. strength) of the stable reduction compound of 4-methyl-6.6'-dichlorothioindigo thereto 45 grams of sodium hydrosulfite concentrated powder, stirring the mixture for a quarter of an hour, thereupon introducing while cooling carbonic acid until the alkaline reaction of the mixture against phenolphthaleine paper has disappeared and isolating the product formed)
80 grams of glycerin
30 grams of the sodium salt of benzylsulfanilic acid
350 grams of wheat starch tragacanth thickening
120 grams of potassium carbonate
40 grams of formaldehyde sulfoxylate
230 grams of water
1000 grams of printing color.

(6) 150 grams of a paste (12 per cent. strength) of the stable reduction compound of 4.4'-dimethyl-5.6.5'.6'-tetrachlorothioindigo (obtainable by heating to 60° C. to 65° C. a mixture of 1000 grams of 4.4'-dimethyl-5.6.5'.6'-tetrachlorothioindigo, 1000 grams of a caustic soda solution of 40° Bé. and 50 liters of water, adding thereto 600 grams of sodium hydrosulfite, stirring for some time at the said temperature and isolating the product which separates)
80 grams of glycerin
30 grams of the sodium salt of benzylsulfanilic acid
350 grams of wheat starch tragacanth thickening
120 grams of potassium carbonate
40 grams of formaldehyde sulfoxylate
230 grams of water
1000 grams of printing color.

(7) 150 grams of a paste (12 per cent. strength) of the stable reduction compound of 4.7.4'.7'-tetramethyl-5.5'-dichlorothioindigo (obtainable by heating to 70° C.–75° C. a mixture of 267 grams of a 15% paste of 4.7.4'.7'-tetramethyl-5.5'-dichlorothioindigo, 1000 grams of water and 44 cc. of a caustic soda solution of 33 Bé., adding thereto 22,5 grams of sodium hydrosulfite concentrated powder, stirring the whole for half an hour at the said temperature and isolating the product which separates).
80 grams of glycerin
30 grams of the sodium salt of benzylsulfanilic acid
350 grams of wheat starch tragacanth thickening
120 grams of potassium carbonate
40 grams of formaldehyde sulfoxylate
230 grams of water
1000 grams of printing color.

We claim:

1. The process which comprises printing materials with a printing paste containing a stable reduction product of a thioindigoide dyestuff and subjecting the printed materials to an aftertreatment in the usual manner by steaming it and oxidizing the leuco compound thus formed and fixed on the fiber to the dyestuff by exposing the material to the air, said stable reduction product being stable to air and oxygen, difficultly soluble in alkali and yielding prints in the usual way but also with a considerably smaller quantity of a reducing agent than is required in the case of the dyestuff proper.

2. The process which comprises printing materials with a printing paste containing a stable reduction product of a thioindigoide dyestuff being substituted by at least one substituent of the group consisting of halogen, alkyl and alkoxy and an agent capable of exerting a reducing action and subjecting the printed materials to an aftertreatment in the usual manner by steaming it and oxidizing the leuco compound thus formed and fixed on the fiber to the dyestuff by exposing the material to the air, said stable reduction product being stable to air and oxygen, difficultly soluble in alkali and yielding prints in the usual way but also with a considerably smaller quantity of a reducing agent than is required in the case of the dyestuff proper.

3. The process which comprises printing materials with a printing paste containing the stable reduction product of 4,4'-dimethyl-6,-6'-dichlorothioindigo and an agent capable of exerting a reducing action and subjecting the printed material to an aftertreatment in the usual manner by steaming it and oxidizing the leuco compound thus formed and fixed on the fiber to the dyestuff by exposing the material to the air, said stable reduction product being stable to air and oxygen, difficultly soluble in alkali and yielding prints in the usual way but also with a considerably smaller quantity of a reducing agent than is required in the case of the dyestuff proper.

4. Printing compositions comprising a stable reduction product of a thioindigoide dyestuff, said stable reduction product being stable to air and oxygen, difficultly soluble in alkali and yielding prints in the usual way but also with a considerably smaller quantity of a reducing agent than is required in the case of the dyestuff proper.

5. Printing compositions comprising a stable reduction product of a thioindigo dyestuff being substituted by at least one substituent of the group consisting of halogen, alkyl and alkoxy and an agent capable of exerting a reducing action, said stable reduction product being stable to air and oxygen, difficultly soluble in alkali and yielding prints in the usual way but also with a considerably smaller quantity of a reducing agent than is required in the case of the dyestuff proper.

6. Printing compositions comprising a stable reduction product of a thioindigoide dyestuff being substituted by at least one substituent of the group consisting of halogen, alkyl and alkoxy, formaldehyde sulfoxylate and the sodium salt of benzylsulfanilic acid, said stable reduction product being stable to air and oxygen, difficultly soluble in alkali and yielding prints in the usual way but also with a considerably smaller quantity of a reducing agent than is required in the case of the dyestuff proper.

7. Printing compositions comprising the stable reduction product of 4.4'-dimethyl-6.6'-dichlorothioindigo, formaldehyde sulfoxylate, the sodium salt of benzylsulfanilic acid, potassium carbonate and a thickening agent, said stable reduction product being stable to air and oxygen, difficultly soluble in alkali and yielding prints in the usual way but also with a considerably smaller quantity of a reducing agent than is required in the case of the dyestuff proper.

8. Printing compositions comprising the stable reduction product of 6.6'-diethoxythioindigo, formaldehyde sulfoxylate, potassium carbonate and a thickening agent, said stable reduction product being stable to air and oxygen, difficultly soluble in alkali and yielding prints in the usual way but also with a considerably smaller quantity of a reducing agent than is required in the case of the dyestuff proper.

9. Printing compositions comprising the stable reduction product of 6.6'-dichlorothioindigo, formaldehyde sulfoxylate, the sodium salt of benzylsulfanilic acid, potassium carbonate and a thickening agent, said stable reduction product being stable to air and oxygen, difficultly soluble in alkali and yielding prints in the usual way but also with a considerably smaller quantity of a reducing agent than is required in the case of the dyestuff proper.

KARL KRAUSS.
ALFRED HAGENBÖCKER.